United States Patent

[11] 3,577,640

[72] Inventor Robert L. Lee
22937 Grand Terrace Road, Colton, Calif. 92324
[21] Appl. No. 864,742
[22] Filed Oct. 8, 1969
[45] Patented May 4, 1971

[54] DENTAL CLUTCHES, AND METHOD AND APPARATUS FOR MAKING
3 Claims, 13 Drawing Figs.

[52] U.S. Cl. .................................................. 32/32
[51] Int. Cl. ............................................. A61c 11/00
[50] Field of Search .......................... 32/32, 17, 19

[56] References Cited
UNITED STATES PATENTS
2,283,385 5/1942 Neustadt ..................... 32/32

Primary Examiner—Robert Peshock
Attorney—Beehler and Arant

ABSTRACT: A dental clutch is disclosed consisting of a rigid tray made of a sheet of plastic material which is shaped to fit over and around the tooth structure of one jaw of a patient; and a preformed plastic stud block having a curved rear face and having a front flat face in which two laterally separated, parallel threaded openings are formed; the stud block being secured to the front vertical surface of the tray so that the threaded openings lie in a plane which is common to the tooth structure.

A method of aligning upper and lower clutches for a patient is also disclosed, in which the threaded openings of the two stud blocks are located in planes which are spaced apart but parallel to each other.

Also disclosed is an alignment fixture for supporting the stud blocks in their aligned relationship during attachment to the respective trays.

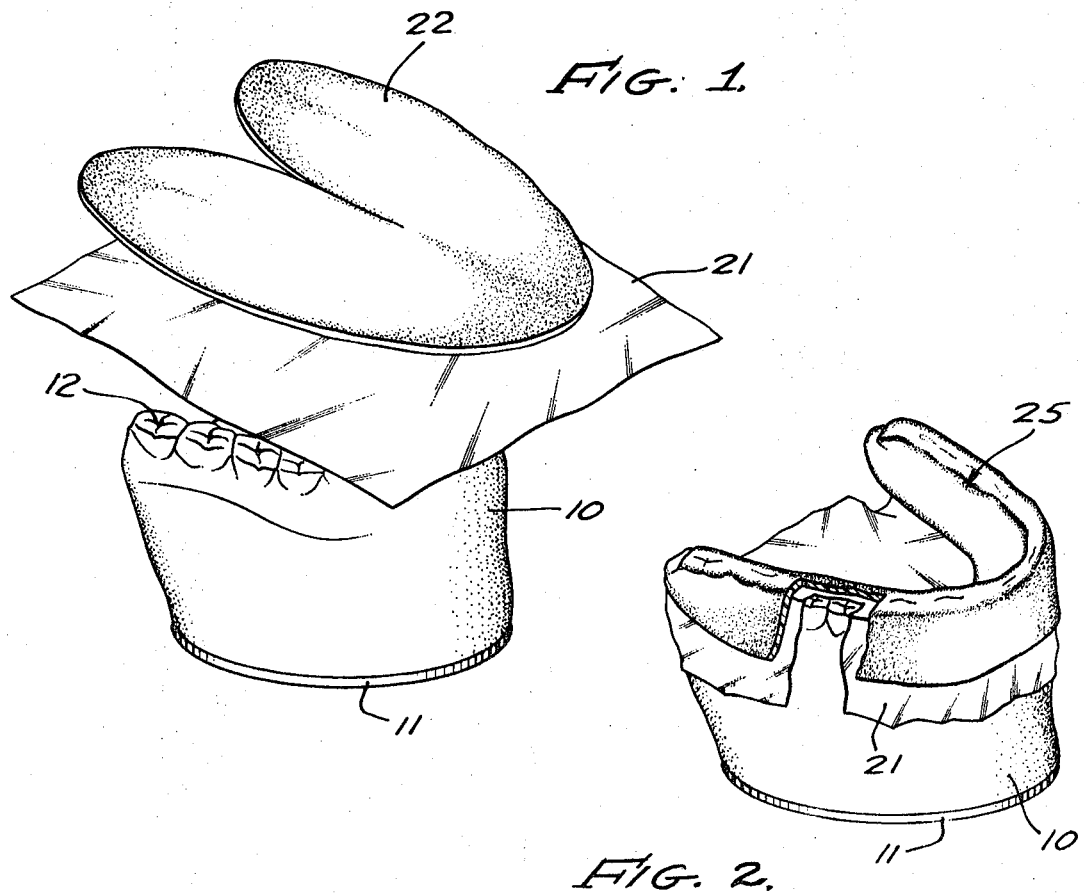
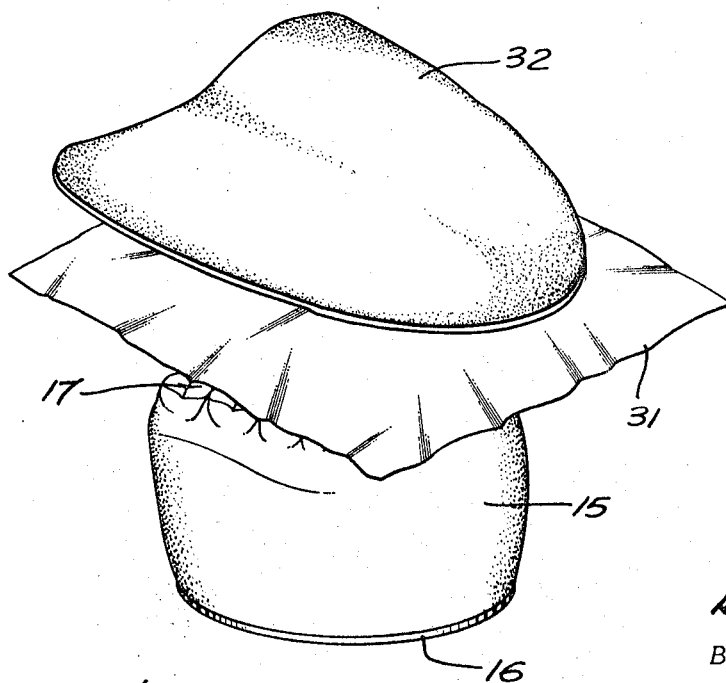
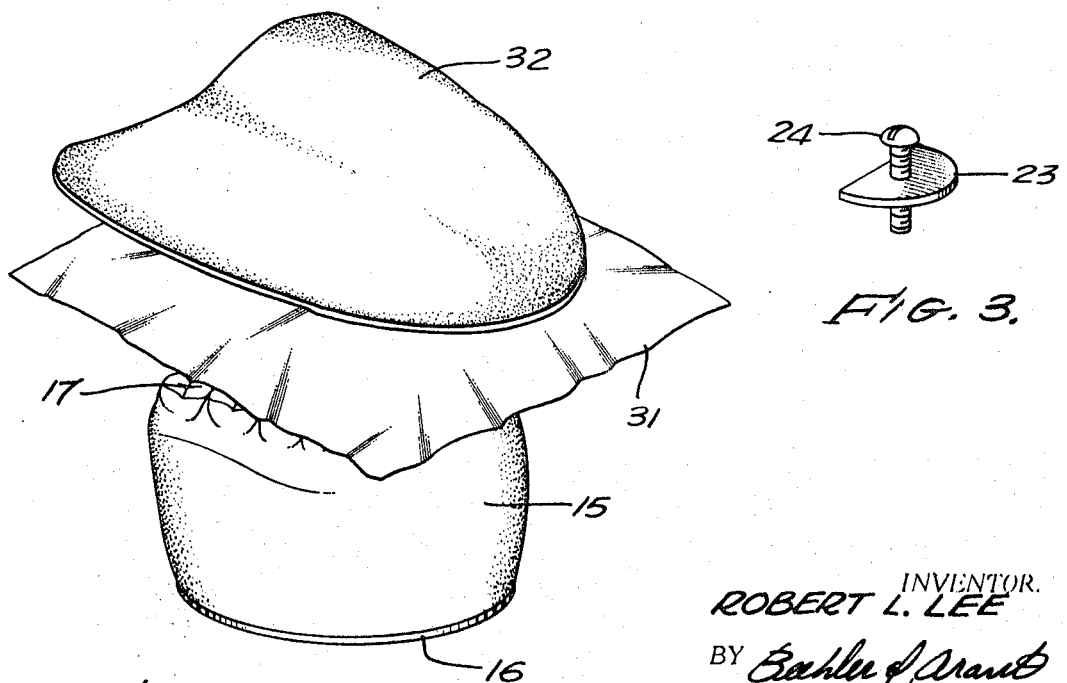

INVENTOR.
ROBERT L. LEE
BY Beehler & Arant
ATTORNEYS

PATENTED MAY 4 1971 3,577,640

INVENTOR.
ROBERT L. LEE
BY Beehler & Arant
ATTORNEYS

DENTAL CLUTCHES, AND METHOD AND APPARATUS FOR MAKING

BACKGROUND OF THE INVENTION

Precise alignment of a pair of dental clutches to each other, and to the apparatus they support, is of great importance where precise jaw movement measurements are being made. The apparatus and method disclosed herein are particularly adapted for use in conjunction with the novel method of recording, transferring, and reproducing jaw movements which is disclosed in my U.S. Pat. No. 3,452,439, issued July 1, 1969.

DRAWING SUMMARY

FIG. 1 is a perspective view of a lower tooth structure cast, and parts for making a plastic tray to fit it;

FIG. 2 is a similar perspective view showing the completed tray;

FIG. 3 is a perspective view of a plastic insert and height-adjusting screw used in conjunction with the lower tray;

FIG. 4 is a perspective view of an upper tooth structure cast and materials for making a plastic tray to fit it;

PREFERRED EMBODIMENT

Figure 5:
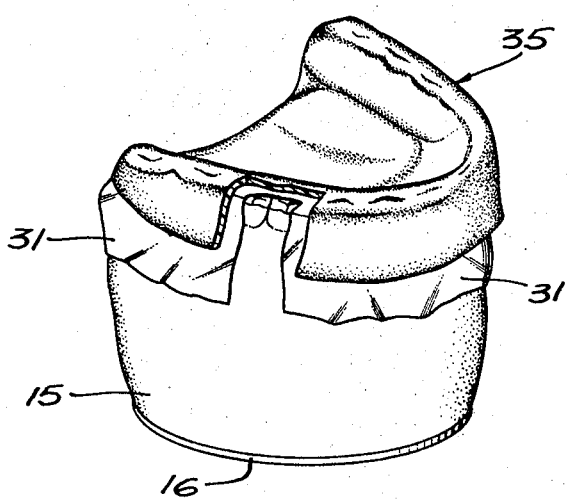
FIG. 5 is a perspective view similar to FIG. 4 but showing the completed tray.

Before preparing clutches in accordance with the present invention the conventional procedure is followed of making impressions of both upper and lower tooth structures of the patient, and then reverse casting from these impressions in order to obtain plaster models or replicas of the tooth structures. Thus a lower cast 10 (FIGS. 1 and 2) is derived which is supported upon a metal mounting plate 11, the portions 12 of cast 11 representing the actual tooth structures themselves. In a similar manner the upper cast 15 (FIGS. 4 and 5) is formed, being supported on a mounting plate 16 with the portion 17 representing the actual tooth structures.

Figure 6:
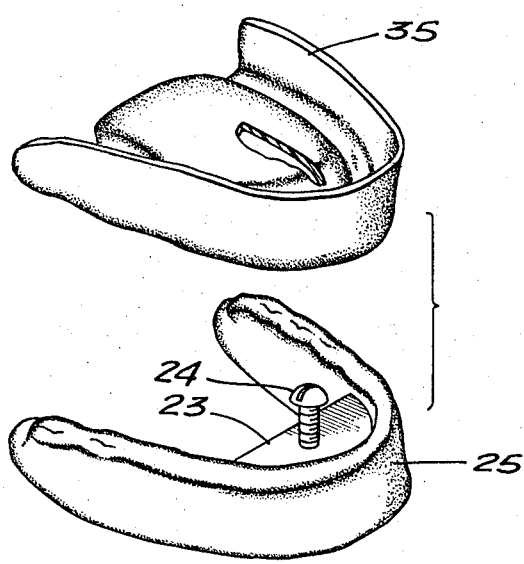
FIG. 6 is a perspective view showing the completed upper and lower trays, with the insert attached inside the lower tray.
Figure 7:
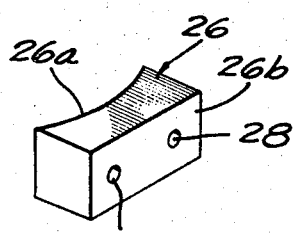
FIG. 7 is a perspective view of a preformed plastic stud block.

The complete lower clutch 20 (FIG. 12) includes a tray 25 (FIGS. 2 and 6), a plastic insert 23 with height-adjusting screw 24 (FIGS. 3 and 6), and a plastic stud block 26 (FIG. 7). The stud block 26 and insert 23 are preformed plastic parts which will be subsequently described. The height-adjusting screw 24 is a metal screw of conventional manufacture. Tray 25 is formed in a manner which will now be described.

Referring to FIGS. 1 and 2, a flat sheet of tinfoil 21 is used to separate a flat sheet 22 of plastic material from the tooth structure 12 of cast 10. Plastic sheet 22 is cut to approximately conform to the shape of the jaw arch. The plastic sheet 22 (protected by tinfoil 21) is folded over and around the tooth structures 12 until it assumes an interfitting relationship. The plastic material is then hardened by a conventional method, such as use of a chemical setting agent, application of suitable temperature, or the like. The completed tray 25 then becomes rigid in the configuration shown in FIG. 2, and may be removed from cast 10 at which time the tinfoil 21 has served its purpose and may be thrown away.

The plastic tray 35 for the upper clutch is made in a similar manner, utilizing tinfoil sheet 31 and plastic sheet 32, as shown in FIGS. 4 and 5. As shown in those FIGS., the upper cast 15 is, for convenience, inverted and rested upon its mounting plate 16.

The plastic insert 23 is a small, semicircular rigid plate which fits within the frontal portion of tray 25, as best seen in FIG. 6. A threaded opening is formed in the center of insert 23, and this threaded opening is occupied by height-adjusting screw 24. The insert 23 is bonded to the inner wall of tray 25 by use of a suitable bonding agent.

Plastic stud block 26 is of generally rectangular configuration, being approximately square in vertical cross section and having a horizontal length about double its thickness. As shown in perspective in FIG. 7, the block 26 has a front vertical surface 26b which is absolutely flat, and in which threaded openings 27, 28 are formed. The threaded openings 27, 28 are laterally separated by a predetermined distance, and are parallel throughout their depth so that they occupy a horizontal plane. The rear vertical surface 26a of block 26 is slightly concave, being curved in a lateral direction from side to side. The purpose of the concave rear surface of block 26 is so that it will fit, at least approximately, the curved front vertical surface of the tray 25. The assembled relationship of tray 25 and block 26 is shown both in FIG. 12 and FIG. 13.

Figure 13:
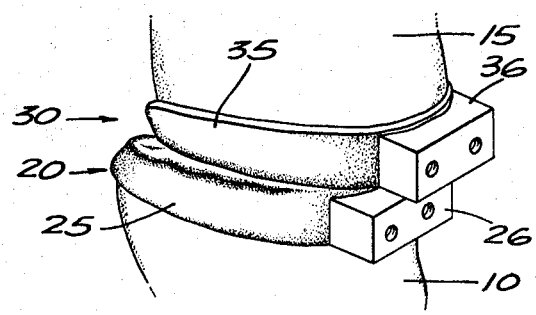
FIG. 13 is a perspective view of the cast with completed clutches attached.
Figure 12:
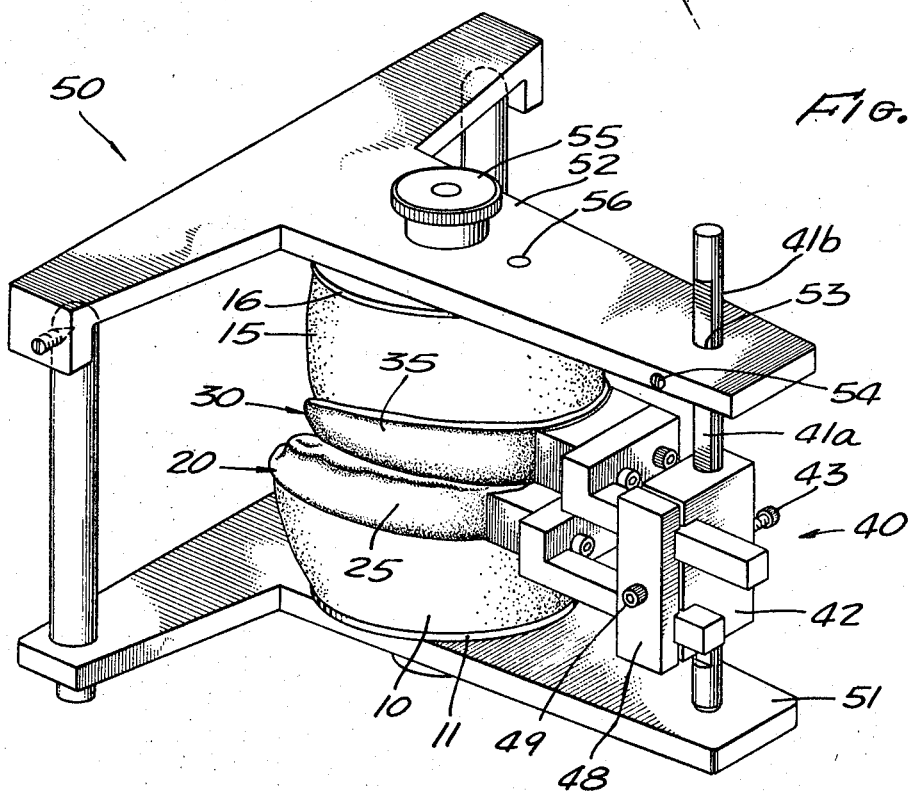
FIG. 12 is a perspective view of an articulator supporting the cast, trays, alignment fixture, and stud blocks.

The complete upper clutch 30 does not include an insert 23, but does include a tray 35 which is generally similar to tray 25, and a stud block 36 which is identical to the stud block 26. The assembled relationship of the upper clutch is shown in FIGS. 12 and 13.

Figure 8:
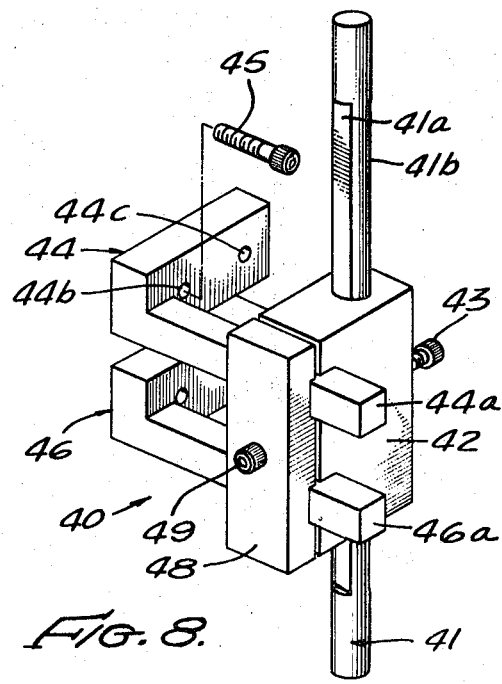
FIG. 8 is a perspective view of an alignment fixture for aligning the stud blocks.
Figure 9:
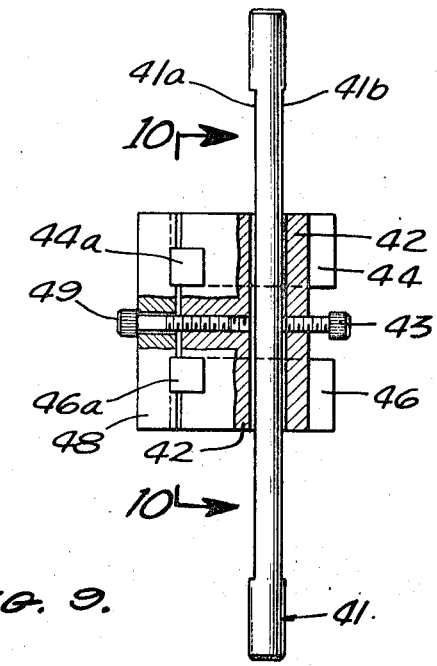
FIG. 9 is an elevational view, partially in cross section, of the alignment fixture.
Figure 10:
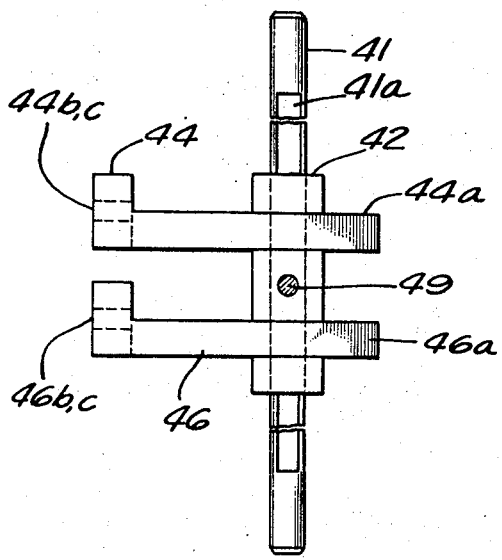
FIG. 10 is a cross-sectional view of the alignment fixture taken on the line 10-10 of FIG. 9.

The alignment fixture 40 shown in FIGS. 8 to 10, inclusive, includes a vertically arranged post 41 having opposing flat sides 41a, 41b. A slide block 42 has a vertical opening through which post 41 passes, and since the post 41 is supported in a fixed position (see FIG. 12), the slide block 42 is moved up and down to establish its selected location. A threaded opening in one side of the slide block 42 receives a setscrew 43 which is tightened against the flat surface 41b (FIG. 9) so as to lock the slide block 42 in its selected position.

An upper alignment jig 44 is used for supporting the stud block 36 of the upper clutch, and an identical lower alignment jig 46 is used for supporting the lower stud block 26. Alignment jig 44 includes a horizontal arm in which threaded openings 44b, 44c are formed, these openings being parallel to each other and being separated by the same lateral distance which separates openings 27, 28 of the stud block. Upper jig 44 also includes a rearwardly extending shank 44a from which it is supported in position. The identically constructed lower jig 46 has threaded openings 46b, 46c, and a rearwardly extending shank 46a.

A retaining block 48 mates with the slide block 42, each of these blocks having a pair of recesses within which the shanks 44a, 46a are captured. A retainer screw 49 passes through an opening in the retainer block 48 and engages a threaded opening in the slide block 42, the retainer screw 49 being tightened when it is desired to lock the shanks 44a, 46a in position.

The method of the present invention is carried out as follows. First the impressions are made from the teeth of the patient, the reverse castings are made, and the casts 10, 15 are formed. Then the trays 25, 35 are made. Insert 23 is attached to the lower tray 25.

Then the casts 10, 15 are supported in their relative positions which correspond to the centric relation position of the patient in a simple hinge axis articulator, such as the articulator 50 shown in FIG. 12. As shown in FIG. 12, the mounting plate 16 is secured to the upper plate 52 of the articulator by means of a retaining screw 55 and dowel pin 56. The mounting plate 11 of cast 10 is secured to the lower plate 51 of the articulator in a similar manner. The trays 25, 35 are positioned on the tooth structures of their respective casts. At this time the stud blocks 26, 36 have not yet been secured to the trays, so the clutches have not yet been completed.

UNITED STATES PATENT OFFICE
CERTIFICATE OF CORRECTION

Patent No. 3,577,640     Dated May 4, 1971

Inventor(s) Robert L. Lee

It is certified that error appears in the above-identified patent and that said Letters Patent are hereby corrected as shown below:

In the grant (only), after column 2, insert columns 3 and 4.

3

Figure 11:
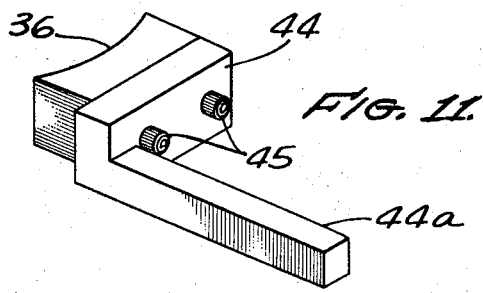
FIG. 11 is a perspective view of one stud block with supporting jig attached to it.

The next step is to support each stud block from its corresponding jig, as shown in FIG. 11 for the stud block 36. Both jigs are then incorporated into the complete alignment fixture, as shown in FIG. 12. The upper end of post 41 passes through an opening 53 of articulator upper plate 52 and is secured by a setscrew 54 which engages flat side 41a of the post. The jigs 44, 46 are first retracted away from the trays 35, 25 so as not to be in engagement with them. Setscrew 43 is loosened and the vertical position of slide block 42 is adjusted so that the correct elevations of the stud blocks relative to the trays is obtained. Then the setscrew 43 is locked in position.

The next step is to slide each of the jigs 44, 46 towards its associated tray, to obtain a proper interengagement between the stud block and tray. Some readjustment in the vertical position of the slide block 42 may be required. When the proper positions are obtained, each jig is retracted individually, and bonding material is inserted between the stud block and its associated tray, before putting the stud block back in contact with the tray. When bonding material has been applied to both stud blocks, and the stud blocks placed in contact with the trays, then the retainer screw 49 is tightened so as to hold the parts in place until the bonding material has hardened.

It may be assumed that one of the jaws of the patient is misaligned relative to the other jaw. However, in accordance with the method of the present invention the configuration of the clutches will be correspondingly modified so that the stud blocks 26, 36 are perfectly aligned with each other. More specifically, the result of the method is that the threaded openings 27, 28 of the lower stud block occupy a plane which is precisely parallel to that occupied by the threaded openings 37, 38 of the upper stud block. This precise alignment of the stud blocks makes it possible to obtain a more precise positioning of the instrumentation for recording jaw movements, as disclosed in my above referenced patent.

I claim:
1. A method of preparing a pair of dental clutches, comprising:
preparing rigid upper and lower trays, each being shaped to fit over and around the tooth structure of the corresponding jaw of the patient;
selecting a pair of stud blocks, each having a vertically

4 disposed front face in which two laterally separated, parallel threaded openings are formed, and each having a rear face which is concavely curved in a lateral direction;
supporting the upper and lower trays in relative positions which correspond to the centric relation position of the patient;
supporting the stud blocks in vertically spaced positions such that the plane of the threaded openings of the upper stud block is precisely parallel to the plane of the threaded openings of the lower stud block;
moving the stud blocks into engagement with their respective trays while maintaining said precisely parallel relationship;
and securing each stud block to its associated tray.
2. A dental clutch comprising:
a rigid tray consisting of a sheet of plastic material shaped to fit over and around the tooth structure of one jaw of a patient, and having a generally vertical front surface which curves rearwardly at its lateral sides;
a generally rectangular plastic stud block having a flat vertically disposed front face in which two laterally separated, parallel threaded openings are formed which extend rearwardly into said block, and having a vertical rear surface which curves rearwardly at its lateral sides so as to fit about the front surface of said tray;
and bonding material securing the rear surface of said stud block to the front surface of said tray;
said stud block being so aligned with said tray that said threaded openings lie in a plane common to said tooth structure.
3. A dental clutch as claimed in claim 2 wherein said tray has a generally vertical rear surface which curves rearwardly at its lateral sides:
and which further includes a semicircular plastic insert horizontally disposed within said tray and bonded to said rear surface thereof opposite to said stud block, said insert having a centrally located and vertically aligned threaded opening;
and a height-adjusting screw received within and extending upwardly from said threaded opening of said insert.

Signed and sealed this 30th day of May 1972.

(SEAL)
Attest:

EDWARD M. FLETCHER, JR.
Attesting Officer

ROBERT GOTTSCHALK
Commissioner of Patents